(12) United States Patent
Hirai et al.

(10) Patent No.: US 9,026,388 B2
(45) Date of Patent: May 5, 2015

(54) METHOD FOR DETERMINING DROP IN CAPACITY OF SODIUM—SULFUR BATTERY

(75) Inventors: Naoki Hirai, Nagoya (JP); Motohiro Fukuhara, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 786 days.

(21) Appl. No.: 13/196,224

(22) Filed: Aug. 2, 2011

(65) Prior Publication Data

US 2011/0295534 A1 Dec. 1, 2011

Related U.S. Application Data

(63) Continuation of application No. PCT/JP2010/051044, filed on Jan. 27, 2010.

(30) Foreign Application Priority Data

Feb. 6, 2009 (JP) .................................. 2009-026097

(51) Int. Cl.
*G01R 31/36* (2006.01)
*G01R 19/00* (2006.01)
*G01R 31/00* (2006.01)
*H01M 10/39* (2006.01)
*H01M 10/48* (2006.01)

(52) U.S. Cl.
CPC ........ *H01M 10/3909* (2013.01); *H01M 10/482* (2013.01)

(58) Field of Classification Search
CPC ....... H01M 2/10; H01M 10/42; H01M 10/48; H01M 10/482; H01M 2010/4271; H01M 10/4207; H01M 10/441; H01M 10/443; H01M 10/3909; G01R 31/3606; G01R 31/362; G01R 31/025; H02J 7/0021

USPC .......................... 702/63, 64, 59, 58
See application file for complete search history.

(56) References Cited

U.S. PATENT DOCUMENTS

| 2008/0076010 A1 | 3/2008 | Sato | |
| 2008/0206626 A1* | 8/2008 | Tamakoshi et al. | ............. 429/61 |
| 2009/0099799 A1* | 4/2009 | Barsoukov et al. | ............. 702/63 |

FOREIGN PATENT DOCUMENTS

| EP | 0 864 876 A1 | 9/1998 |
| EP | 1 968 151 A2 | 9/2008 |
| JP | 03-158781 A1 | 7/1991 |
| JP | 05-258779 A1 | 10/1993 |
| JP | 07-137612 A1 | 5/1995 |
| JP | 08-050930 A1 | 2/1996 |
| JP | 2000-123883 A1 | 4/2000 |
| JP | 2000-182662 A1 | 6/2000 |
| JP | 2004-247319 A1 | 9/2004 |
| JP | 2008-084677 A1 | 4/2008 |
| JP | 2008-251291 A1 | 10/2008 |

OTHER PUBLICATIONS

Extended European Search Report dated Jan. 2, 2013.

* cited by examiner

*Primary Examiner* — Eliseo Ramos Feliciano
*Assistant Examiner* — Yoshihisa Ishizuka
(74) *Attorney, Agent, or Firm* — Burr & Brown, PLLC

(57) ABSTRACT

It is determined that a drop in the capacity of a sodium-sulfur battery has proceeded to an abnormal level when both the following expression (1) and expression (2) hold. $Qe-Qn \geq K1$ ... (1) where Qe: abnormal block depth of discharge; Qn: normal block depth of discharge; and K1: block abnormality determination set point (setting value) and $Qe \geq K2$ ... (2) where K2: depth of discharge abnormality determination set point (setting value).

4 Claims, 5 Drawing Sheets

METHOD FOR DETERMINING DROP IN CAPACITY OF SODIUM—SULFUR BATTERY

BACKGROUND ON THE INVENTION

1. Field of the Invention

The present invention relates to a method for determining a drop in the capacity of a sodium-sulfur battery, including a case where a failure of an electric cell occurs.

2. Description of Related Art

A sodium-sulfur battery may be cited as one of electric power storage devices which are expected to see a wider use in various application fields, such as load leveling, measures against a momentary drop in power, or compensation for fluctuations in the power generated by a renewable energy generating device. The operating cycle of the sodium-sulfur battery is such that a cycle which consists of a discharge and a charge is repeated with an idle period between the repeated cycles in the application of, for example, the load leveling.

The sodium-sulfur battery is generally configured by connecting a plurality of electric cells in series to form a string, and then connecting a plurality of the strings in parallel to form a block. Further, a plurality of the blocks is connected in series to form a module, and then a plurality of the modules is connected in series to complete the sodium-sulfur battery.

Failure of the sodium-sulfur battery to exhibit its expected performance leads to a problem in the aforesaid applications, such as the load leveling, measures against a momentary drop in power, and the compensation for fluctuations in power. Hence, it is necessary to monitor the sodium-sulfur battery for a failure or abnormality.

Hitherto, in such a sodium-sulfur battery, voltage measurement has been carried out on each block, which is formed of a plurality of strings connected in parallel, each of which is comprised of electric cells connected in series, when the voltage of the battery is stable during a period of rest from the completion of a discharge to the start of a charge. If a block indicating a relative drop in voltage is found, then it has been determined that an electric cell or cells in the block have failed and therefore the (entire) sodium-sulfur battery has failed.

JP-A-2004-247319, for example, may be cited as a prior art.

SUMMARY OF THE INVENTION

The sodium-sulfur battery is regarded to be exhibiting its expected performance as long as it is capable of charging/discharge on the basis of a predetermined capacity, while there is a case where a voltage drop in a block does not immediately mean a failure or abnormality of the sodium-sulfur battery.

For example, at the early stage of delivery of a battery (when a battery is brand-new), the battery hardly has a residual capacity (an unavailable capacity of a product capacity (absolute capacity)). Therefore, in a sodium-sulfur battery designed by considering that the residual capacity increases with age, a drop in a block voltage within a predetermined range at the early stage of delivery does not mean that the sodium-sulfur battery is incapable of charging/discharging on the basis of a predetermined capacity.

Further, after completion of a discharge, it takes a few hours (approximately two hours at the shortest) before the voltage of the battery stabilizes. However, especially when the battery is used for load leveling, providing such a long period of rest means installing a backup system, which is undesirable cost-wise, in the application of compensating for fluctuations in the power generated by a renewable energy generating device.

The present invention has been made with a view of the background described above and it is an object of the invention to provide a means capable of properly determining a failure or abnormality of a sodium-sulfur battery applicable to the compensation for fluctuations in power generated by a renewable energy generating device. Studies have revealed that the object can be fulfilled by the following means based on a depth of discharge (absolute depth) rather than a voltage.

The present invention provides a method for determining a drop in capacity (abnormality or failure) of a sodium-sulfur battery whereby to determine that the capacity thereof has dropped to an abnormal level when both expression (1) and expression (2) given below hold, the sodium-sulfur battery being constituted by forming a string by connecting an s number of (a plurality of) electric cells in series, connecting a u number of (a plurality of) the strings in parallel to form a block, connecting an b number of (a plurality of) the blocks in series to form a module, and then connecting an m number of (a plurality of) the modules in series.

$$Qe - Qn \geq K1 \quad (1)$$

where
- Qe: abnormal (failed) block depth of discharge [Ah]
- Qn: normal (ordinary) block depth of discharge [Ah]
- K1: block abnormality determination set point (setting value)

$$Qe \geq K2 \quad (2)$$

where
- K2: depth of discharge abnormality determination set point (setting value)

$$Qn = u \times f1(Vi(t, T, Id)) \quad (3)$$

where
- f1 (Vi (t, T, Id)): transform function for determining the depth of discharge [Ah] of a block by comparing, between the modules, the blocks having a highest voltage [V] among the blocks in the modules and then determining the depth of discharge [Ah] of the block on the basis of the voltage [V] of the block of the module, the voltage of which is an i-th highest voltage (The voltage [V] is to be obtained by converting into a stable open-circuit voltage [V] on the basis of an unstable open-circuit voltage [V] measured after t hours following completion of a discharge in a single-phase region and then correcting the converted stable open-circuit voltage [V] on the basis of a temperature T [° C.] upon completion of the discharge and a discharge current Id[A] upon completion of the discharge.)

$$Qe = u \times f2(V\min(t, T, Id)) \quad (4)$$

where
- f2 (Vmin (t, T, Id)): transform function for determining the depth of discharge [Ah] of a block by comparing, between the modules, the blocks having a lowest voltage [V] among the blocks in the modules and then determining the depth of discharge [Ah] of the block on the basis of the voltage [V] of the block of the module having the lowest voltage [V] (The voltage [V] is to be obtained by converting into a stable open-circuit voltage [V] on the basis of an unstable open-circuit voltage [V] measured after t hours following completion of the discharge in the single-phase region and then correcting the converted stable open-circuit voltage [V] on the basis of the temperature T[° C.] upon completion of the discharge and the discharge current Id[A] upon completion of the discharge.)

The method for determining a drop in the capacity of a sodium-sulfur battery in accordance with the present invention is, in other words, a method for determining an abnormality or failure of a sodium-sulfur battery.

In the method for determining a drop in the capacity of a sodium-sulfur battery in accordance with the present invention, each of a block abnormality determination set point K1 and a depth of discharge abnormality determination set point K2 is preferably set in a plurality of levels. Specifically, the plurality of levels may be approximately two levels.

The method for determining a drop in the capacity of a sodium-sulfur battery is ideally used in the case where the sodium-sulfur battery to be determined is a sodium-sulfur battery which constitutes an electric power storage-compensation device to compensate for output fluctuations in a power generating device in an interconnected system, which combines the power generating device incurring output fluctuations and the electric power storage-compensation device to supply power to a power system.

In the method for determining a drop in the capacity of a sodium-sulfur battery according to the present invention, whether a certain region is a single-phase region is determined by determining whether the region is a region in which a voltage falls in the relationship between a depth of discharge and a voltage (which will be discussed in more detail hereinafter). Alternatively, a determination voltage may be set beforehand to determine whether a region is a single-phase region so as to determine that a certain region is a single-phase region if a voltage falls to the preset voltage or less. In this case, the value of the determination voltage may be set to be slightly lower (by a predetermined value) than a certain voltage in a two-phase region.

In the method for determining a drop in the capacity of a sodium-sulfur battery according to the present invention, temperature means a battery operating temperature or more specifically, the temperature in a module during an operation.

The voltages, currents, depths, capacities (electrical quantities) and the like in the present description are denoted in terms of expressions or the like with the references thereof shown. It is needless to say, however, that there are cases where they can be mutually converted into the values or quantities of electric cells, blocks, modules, the entire sodium-sulfur battery (a plurality of modules) or the like, as necessary.

According to the method for determining a drop in the capacity of a sodium-sulfur battery in accordance with the present invention, it is determined that the capacity has dropped to an abnormal level if both expression (1) and expression (2) mentioned above hold. More specifically, as understood from expression (1) and expression (2) and further expression (3) and expression (4), which determine terms indicated in expression (1) and expression (2), a drop in the capacity is determined on the basis of a corrected depth of discharge. This arrangement makes it possible to determine the capability related to the charge and discharge of an actual sodium-sulfur battery and to accurately determine a failure or an abnormality without erroneously concluding that the battery has incurred a failure or an abnormality as long as the battery is capable of charging/discharging on the basis of a predetermined (designed) capacity.

Further, as indicated by expression (3) and expression (4), the depth of discharge is determined on the basis of a voltage measured after the elapse of t hours from completion of a discharge. Hence, an extended period of rest for a voltage to completely become stable is not required, making the method ideally usable for determining a drop in the capacity of a sodium-sulfur battery applied to compensate for the fluctuations in the power generated by a renewable energy generating device.

According to a preferred embodiment of the method for determining a drop in the capacity of a sodium-sulfur battery in accordance with the present invention, each of the block abnormality determination set point K1 and the depth of discharge abnormality determination set point K2 are set in, (for example), two levels, thus making it possible to determine in different levels, namely, a noncritical level and a critical level according to how low the capacity has dropped. Further, depending on, for example, whether the level is noncritical or critical, the level of an alarm, a reporting destination and the like can be differentiated or changed, so that proper action can be taken according to the level of an abnormality or a failure.

DETAILED DESCRIPTION OF THE INVENTION

Figure 1:
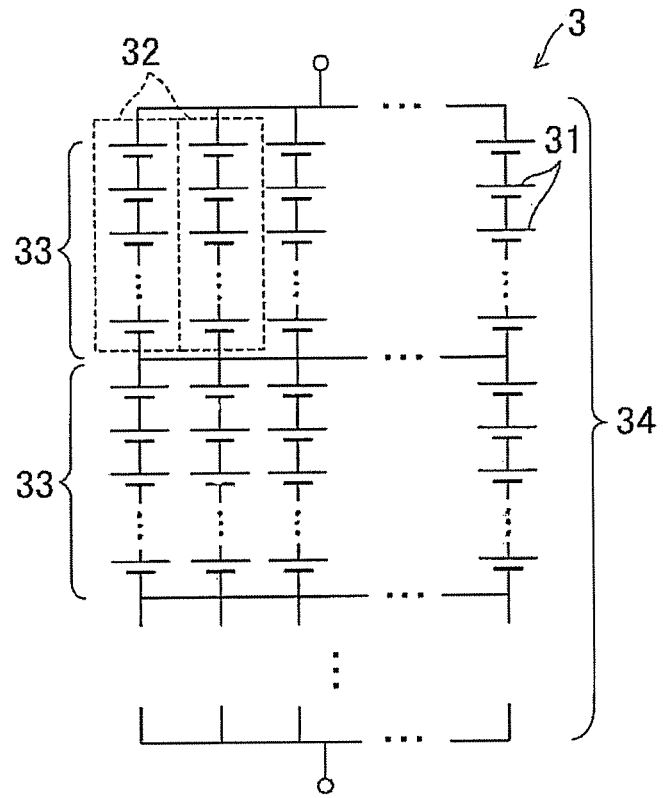
FIG. 1 is a circuit diagram illustrating an example of a module constituting a sodium-sulfur battery.

The following will describe embodiments of the present invention with reference to the accompanying drawings, as appropriate. However, the embodiments are not deemed to limit the interpretation of the present invention. Various changes, modifications, improvements, replacements may be added according to the knowledge of persons skilled in the art within the spirit and scope of the present invention. For example, although the accompanying drawings illustrate preferred embodiments of the present invention, the present invention is not limited by the embodiments illustrated in the drawings or information given in the drawings. To embody or verify the present invention, the same or equivalent means as or to the means described in the present description may be applied. However, a preferred means is the one described below.

Figure 2:
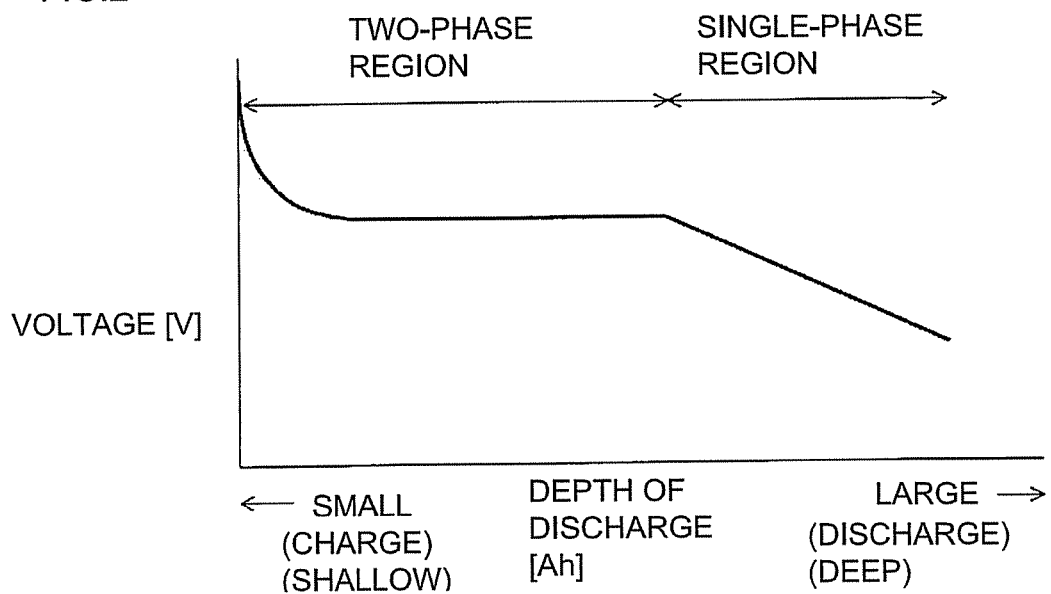
FIG. 2 is a graph illustrating the relationship between depth of discharge and voltage of the sodium-sulfur battery.
Figure 3:
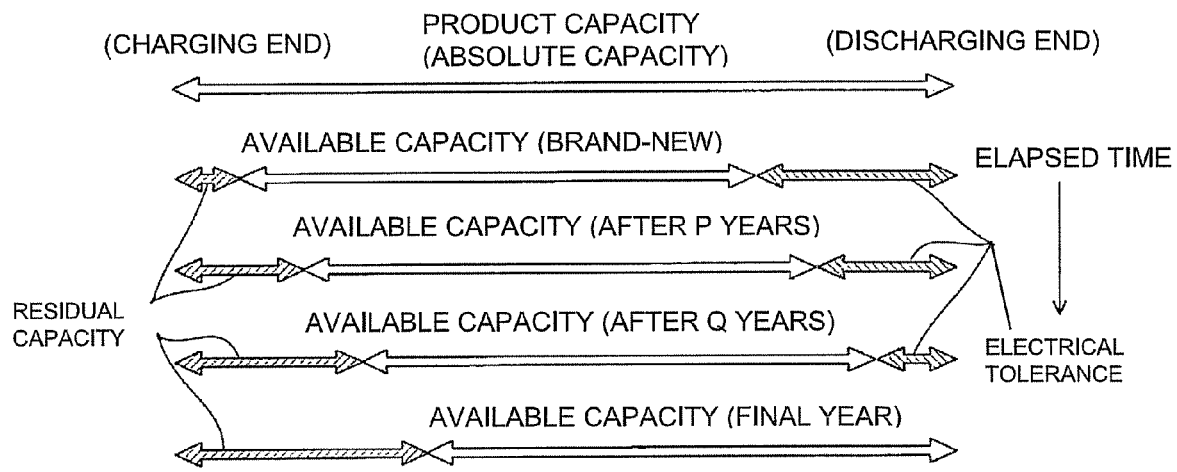
FIG. 3 is a conceptual diagram illustrating the age deterioration of the sodium-sulfur battery.

First, with reference to FIG. 1 to FIG. 3, the construction and applications of a sodium-sulfur battery will be exemplified, and general principle and operation thereof will be explained. FIG. 1 is a circuit diagram illustrating an example of a module constituting the sodium-sulfur battery. FIG. 2 is a graph illustrating the relationship between depth of discharge (absolute depth) and voltage of the sodium-sulfur battery. FIG. 3 is a conceptual diagram illustrating the age deterioration of the sodium-sulfur battery.

A sodium-sulfur battery 3 has a plurality of (an m number of) modules 34 shown in FIG. 1. Each of the modules 34 is constructed of a plurality of (an b number of) blocks 33 connected in series, each of the blocks 33 is constructed of a plurality of (a u number of) strings 32 connected in parallel, and each of the strings 32 is constructed of a plurality of (an s number of) electric cells 31 connected in series.

The electric cell 31 has a molten metal sodium, which is a cathode active material, and a molten sulfur, which is an anode active material. The cathode active material and the anode active material are isolated by a beta alumina solid electrolyte, which has selective permeability with respect to sodium ions. The sodium-sulfur battery is a high-temperature secondary battery operated at about 280° C. to about 350° C. (around 300° C.). At the time of a discharge, the molten sodium emits electrons and becomes a sodium ion, which moves to the anode side through a solid electrolyte tube so as to react with sulfur and electrons having passed through an external circuit to generate sodium polysulfide, thereby generating a voltage of approximately 2V in the electric cell 31. Reversely from a discharge, the production reaction between sodium and sulfur takes place in a charge. The operating cycle of the sodium-sulfur battery consists of the repetition of a cycle of the aforesaid discharge and charge with a rest between the cycles when the battery is used in, for example, load leveling.

As illustrated in FIG. 2, the voltage (e.g., a block voltage) while the sodium-sulfur battery is in operation remains almost constant except for the vicinity of the end of a charge or a discharge. The voltage obviously rises toward the end of the charge and obviously falls toward the end of the discharge with a reduction in the molar proportion of sulfur. In the sodium-sulfur battery, the composition of the sodium polysulfide generated at the positive electrode changes according to a depth of discharge. The changes in the composition are indicated in terms of the value of "x" of "$Na_2S_x$." In a fully charged state, the positive electrode provides a two-phase region wherein S and $Na_2S_5$ coexist. In the two-phase region, a certain electrochemical reaction continues and the voltage remains constant except in the vicinity of the end of the charge although the voltage rises as internal resistance increases (the region showing a flat relationship between the depth of discharge and the voltage in FIG. 2). As the discharge proceeds, the discrete S runs out, causing the positive electrode to turn into a single-phase region wherein $Na_2S_x$ (x<5) applies (a region showing a descending relationship between the depth of discharge and the voltage in FIG. 2). In the single-phase region, the molar proportion of sulfur reduces ("x" reduces) and the voltage drops substantially linearly as the discharge proceeds. When the discharge further proceeds, causing x to be 3 or less, a solid phase having a high melting point ($Na_2S_2$) is generated, preventing any further discharge.

As with many other secondary batteries, a sodium-sulfur battery in a brand-new state cannot be fully charged 100% although the product capacity (the absolute capacity) is fixed, and has a residual capacity, as illustrated in FIG. 3. The (aging) residual capacity that prevents a full charge increases as time passes. For this reason, in designing a sodium-sulfur battery, an electrical tolerance is considered for an available capacity, so that the electrical tolerance compensates for an increase in the residual capacity thereby to secure the available capacity until the final year (expected life) is reached. In the present description, the electrical tolerance in each year is indicated by the capacity obtained by subtracting the (aging) residual capacity in each year from the residual capacity in the final year (zero (no) electrical tolerance).

As with many other secondary batteries, a sodium-sulfur battery in a brand-new state cannot be fully charged 100% although the product capacity (the absolute capacity) is fixed, and has a residual capacity, as illustrated in FIG. 3. The (ageing) residual capacity that prevents a full charge increases as time passes. For this reason, in designing a sodium-sulfur battery, an electrical tolerance is considered for an available capacity, so that the electrical tolerance compensates for an increase in the residual capacity thereby to secure the available capacity until the final year (expected life) is reached. In the present description, the electrical tolerance in each year is indicated by the capacity obtained by subtracting the (ageing) residual capacity in each year from the residual capacity in the final year (zero (no) electrical tolerance).

A description will now be given of an embodiment of the method for determining a drop in the capacity of a sodium-sulfur battery in accordance with the present invention by taking, as an example, the case of the sodium-sulfur battery 3 illustrated in FIG. 1. The number (the series number) of the modules 34 of the sodium-sulfur battery 3 is ten, the number (the series number) of the blocks 33 constituting the module 34 is four, the number (the parallel number) of the strings 32 constituting the block 33 is twelve, and the number (the series number) of the electric cells 31 constituting the string 32 is eight.

According to the method for determining a drop in the capacity of the sodium-sulfur battery in accordance with the present invention, it is determined that the capacity of the sodium-sulfur battery 3 has dropped to an abnormal level when both expression (1) and expression (2) given below hold. Setting a block abnormality determination set point K1 in two levels makes it possible to additionally determine that the capacity of the sodium-sulfur battery 3 has dropped to the vicinity of the abnormal level.

$$Qe - Qn \geq K1 \quad (1)$$

where
Qe: abnormal (failed) block depth of discharge [Ah]
Qn: normal (ordinary) block depth of discharge [Ah]
K1: block abnormality determination set point (setting value)

$$Qe \geq K2 \quad (2)$$

where
K2: depth of discharge abnormality determination set point (setting value).

The normal (ordinary) block depth of discharge Qn [Ah] in expression (1) is determined according to the following expression (3').

$$Qn = 12 \times f1(V5(0.5, T, Id)) \quad (3')$$

where
f1 (V5 (0.5, T, Id)): transform function for determining the depth of discharge [Ah] of the block 33 by comparing, between the modules 34, the blocks 33 having a highest voltage [V] among the blocks 33 in each of the modules 34 and then determining the depth of discharge [Ah] of the block 33 on the basis of the voltage [V] of the block 33 of the module 34, the voltage of which is (for example) a fifth (5th) highest voltage (The voltage [V] is to be obtained by converting into a stable open-circuit voltage [V] on the basis of an unstable open-circuit voltage [V] measured after 30 minutes (0.5 hours) passes following completion of a discharge in the single-phase region and then correcting the converted stable open-circuit voltage [V] on the basis of a temperature T [° C.] upon completion of the discharge and a discharge current Id[A] upon completion of the discharge.

The voltage of the sodium-sulfur battery 3 stabilizes in two to four hours after completion of a discharge, so that the depth of discharge can be easily calculated by measuring the open-circuit voltage at the end of the (true) discharge at the point of time in the block. However, it is difficult to hold the battery at rest for such a long time especially when used for compensating for fluctuations in the power generated by a renewable energy generating device. Hence, the method for determining a drop in the capacity of the sodium-sulfur battery in accordance with the present invention uses a means for determining the (true, stabilized) open-circuit voltage at the end of a discharge on the basis of the transient voltage indicated by the sodium-sulfur battery after completion of the discharge.

To be more specific, for the measurement of the voltage of the block 33 in the module 34, the open-circuit voltage [V] of the block 33 is measured, for example, thirty minutes (30 minutes (0.5 hours)) after completion of a discharge in a single-phase region (refer to FIG. 2). The open-circuit voltage at this time is referred to as the 30-minute rest OCV (Open Circuit Voltage). Then, the 30-minute rest OCV is converted into the open-circuit voltage [V] of the block 33 after the elapse of, for example, two hours (2 hours). This open-circuit voltage is referred to as the 2-hour rest OCV and considered to be the true open-circuit voltage value (before the correction based on the temperature and the discharge current).

Figure 4:
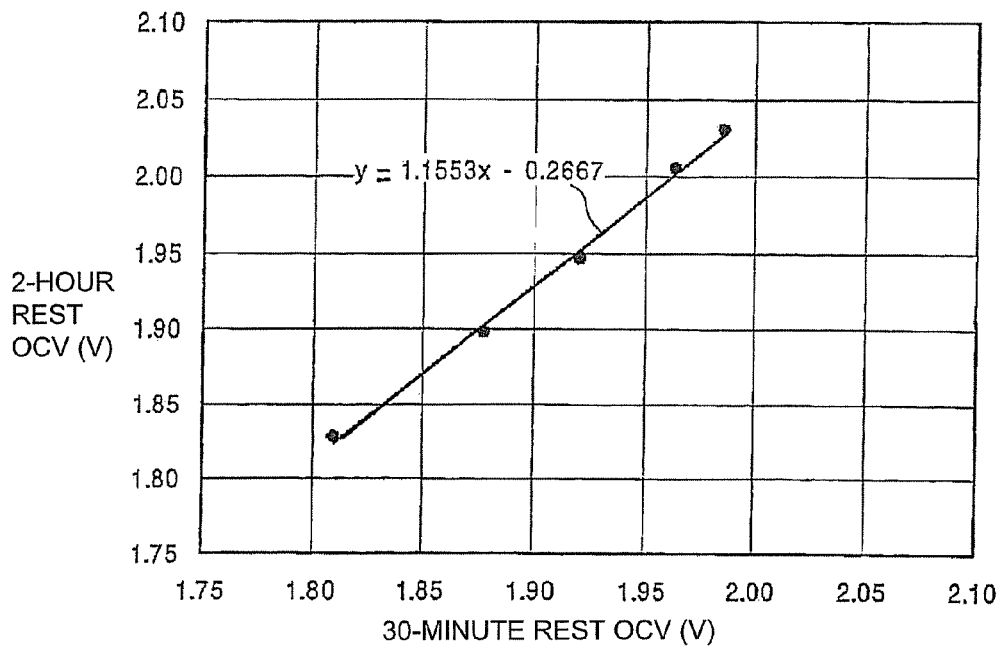
FIG. 4 is a graph illustrating the relationship between 30-minute rest OCV and 2-hour rest OCV after completion of a discharge in a single-phase region.

The conversion can be accomplished on the basis of the relationship illustrated in FIG. 4. In the expression (y=1.1553x−0.2667) shown in FIG. 4, x denotes the 30-minute rest OCV, and y denotes the 2-hour rest OCV (the true open-circuit voltage before correction).

Figure 5:
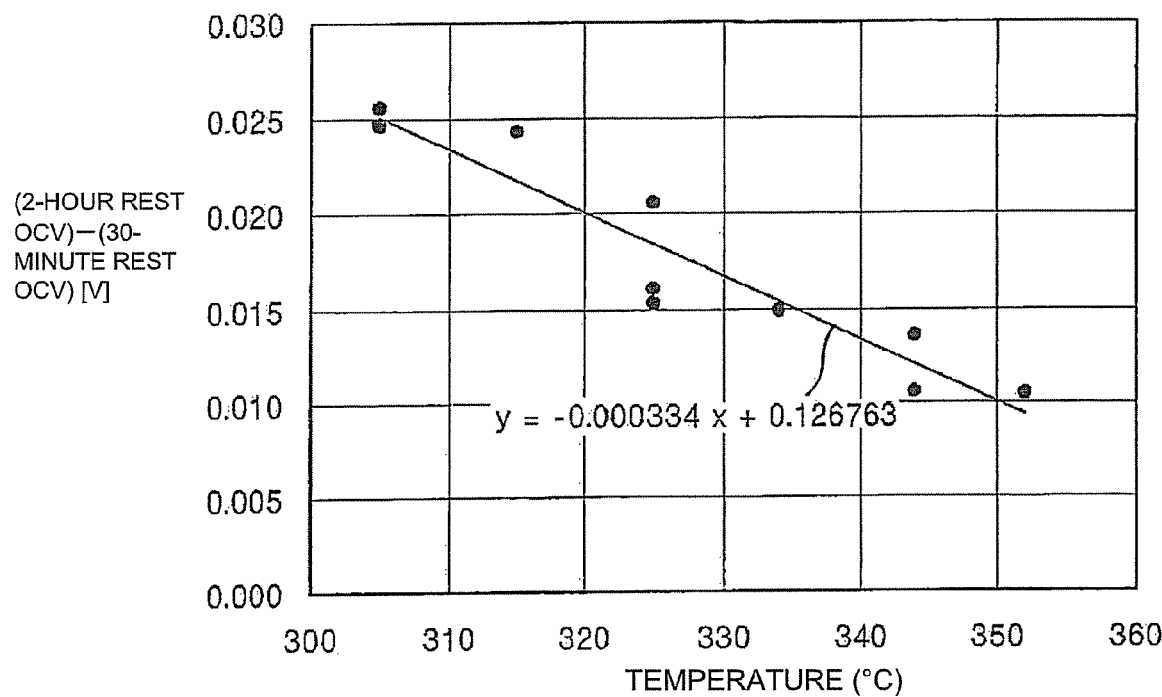
FIG. 5 is a graph illustrating the relationship between the temperature upon completion of a discharge and the value of ((the 2-hour rest OCV)–(the 30-minute rest OCV)) after completion of the discharge in the single-phase region.
Figure 6:
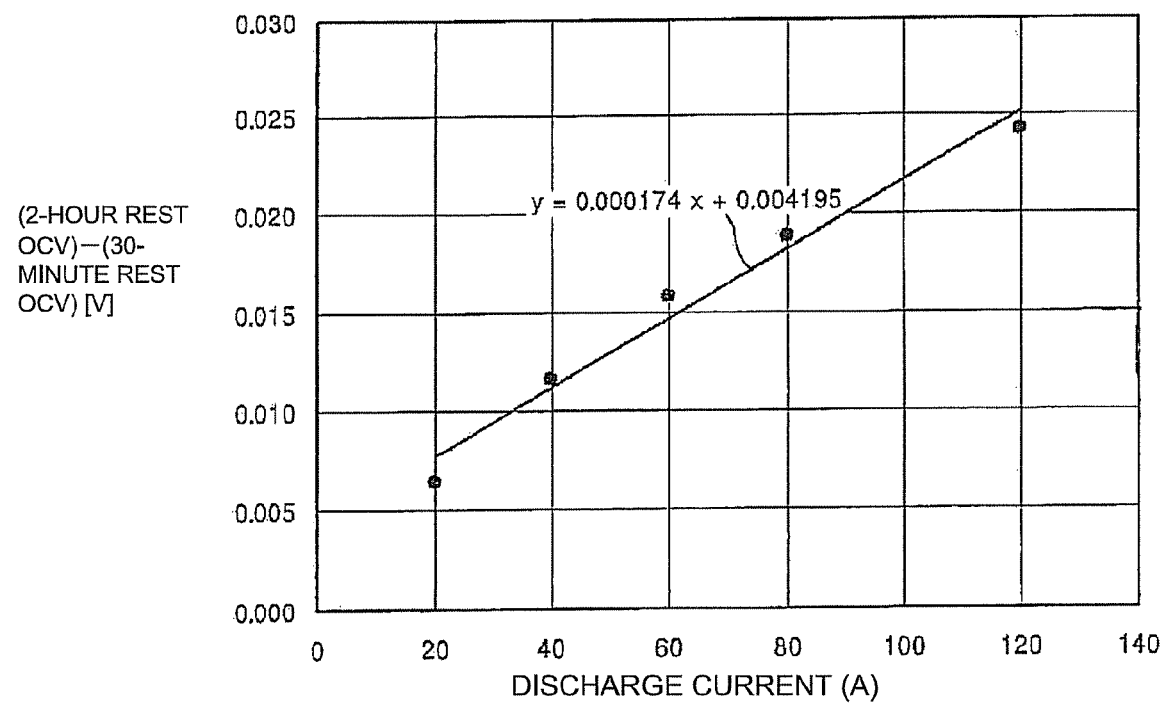
FIG. 6 is a graph illustrating the relationship between the discharge current upon completion of the discharge and the value of ((the 2-hour rest OCV)–(the 30-minute rest OCV)) after completion of the discharge in the single-phase region.

A further correction is made on the basis of the temperature T[° C.] and the discharge current Id[A] upon completion of the discharge to determine the true open-circuit voltage value of the block. As illustrated in FIG. 5 and FIG. 6, the correction can be accomplished on the basis of the fact that the value of (the 2-hour rest OCV−the 30-minute rest OCV)[V] and the temperature T[° C.] and the discharge current [A] have a predetermined relationship. The value of (the 2-hour rest OCV−the 30-minute rest OCV)[V] is a correction value (a value to be corrected), and a subject (target) of the correction is the 2-hour rest OCV (before correction) [V] determined on the basis of the 30-minute rest OCV.

In the expression (y=−0.000334x+0.126763) shown in FIG. 5, x denotes temperature and y denotes (the 2-hour rest OCV−the 30-minute rest OCV). According to FIG. 5, if the temperature rises by, for example, 10° C., then a correction of approximately −0.004V (−4 mV) is required.

In the expression (y=0.000174x+0.004195) shown in FIG. 6, x denotes discharge current and y denotes (the 2-hour rest OCV−the 30-minute rest OCV). According to FIG. 6, if the discharge current increases by, for example, 10 A, then a correction of approximately +0.003V (3 mV) is required.

For each module 34, the voltages of the blocks 33 constituting the module 34 are determined to identify the block 33 having a highest voltage [V]. Then, based on the (highest) voltage of the block 33 determined in each of the modules 34, the comparison among the modules 34 is carried out to determine the voltage of the block 33 in the module 34 having (for example) a fifth (5th) highest voltage.

Subsequently, the determined voltage [V] is converted into the depth of discharge [Ah]. The voltage is based on a voltage measured in the single-phase region, so that the voltage [V] can be converted into the depth of discharge [Ah] (refer to FIG. 2). The depth of discharge is based on the voltage of the block 33 and therefore equivalent to the capacity of a single string 32. Thus, multiplying the depth of discharge by twelve (12), which is the number of the strings 32, determines the depth of discharge [Ah] of the block. This is a normal (ordinary) block depth of discharge Qn [Ah].

In the same manner, the abnormal (failed) block depth of discharge Qe [Ah] is determined. The abnormal block depth of discharge Qe [Ala] in expression (1) is determined according to expression (4') given below.

$$Qe = 12 \times f2(V\min(0.5, T, Id)) \qquad (4')$$

where f2 (Vmin(0.5, T, Id)): transform function for determining the depth of discharge [Ah] of the block 33 by comparing, between the modules 34, the blocks 33 having a lowest voltage [V] among the blocks 33 in the modules 34 and then determining the depth of discharge [Ah] of the block 33 on the basis of the voltage [V] of the block 33 of the module 34, the voltage of which is the lowest (The voltage [V] is to be obtained by converting into a stable open-circuit voltage [V] on the basis of an unstable open-circuit voltage [V] measured after 30 minutes (0.5 hours) pass following completion of a discharge in the single-phase region and then correcting the converted stable open-circuit voltage [V] on the basis of a temperature T[° C.] upon completion of the discharge and a discharge current Id[A] upon completion of the discharge.)

In the same manner as the case where the normal block depth of discharge Qn, for each module 34, the voltages of the blocks 33 constituting the module 34 are determined to identify the block 33 having a lowest voltage [V]. Then, based on the (lowest) voltage of the block 33 determined in each of the modules 34, the voltages are compared among the modules 34 to determine the voltage of the block 33 in the module 34 having the lowest voltage. Subsequently, the determined voltage [V] is converted into the depth of discharge [Ah], and then the depth of discharge is multiplied by 12 (twelve), which is the number of the strings 32, thereby to determine the depth of discharge [Ah] of the block. This is an abnormal (failed) block depth of discharge Qe [Ah].

After determining the normal block depth of discharge Qn and the abnormal block depth of discharge Qe, the difference between the abnormal block depth of discharge Qe and the normal block depth of discharge Qn is determined (refer to expression (1)). If the determined value is the block abnormality determination set point K1 or more, then it means that a condition for determining that a drop in the capacity of the sodium-sulfur battery 3 has proceeded to an abnormal level is satisfied.

In addition, after the normal block depth of discharge Qn and the abnormal block depth of discharge Qe are determined, the abnormal block depth of discharge Qe is compared with the depth of discharge abnormality determination set point K2 (refer to expression (2)). If the abnormal block depth of discharge Qe is the depth of discharge abnormality determination Set point K2 or more, then it means that another condition for determining that a drop in the capacity of the sodium-sulfur battery 3 has proceeded to an abnormal level is satisfied.

If expression (1) is satisfied, then it is very likely that a failure of an electric cell 31 has occurred. This alone, however, does not lead to a conclusion that the drop in the capacity of the sodium-sulfur battery 3 has progressed to an abnormal level, because, the sodium-sulfur battery 3, as a whole, may still be capable of accomplishing charges/discharges on the basis of a predetermined capacity as designed. Only if the abnormal block depth of discharge Qe is the depth of discharge abnormality determination set point K2 or more, it is determined that the drop in the capacity of the sodium-sulfur battery 3 has reached an abnormal level. This is because, in this case, the sodium-sulfur battery 3, as a whole, is no longer capable of accomplishing charges/discharges on the basis of the predetermined capacity as designed.

As described above, setting the two levels for each of the block abnormality determination set point K1 and the depth of discharge abnormality determination set point K2 makes it possible to determine that a drop in the capacity of the sodium-sulfur battery 3 has reached an abnormal level and also to determine that the drop has proceeded to the vicinity of the abnormal level. For example, the block abnormality determination set point K1 and the depth of discharge abnormality determination set point K2 may be set such that a likelihood of the sodium-sulfur battery 3 becoming incapable of outputting a rated capacity will be detected at the first level, and an extremely high likelihood of the sodium-sulfur battery 3 becoming incapable of outputting the rated capacity will be detected at the second level.

Further, the block abnormality determination set point K1 and the depth of discharge abnormality determination set point K2 are setting values that should be changed according to the age of the sodium-sulfur battery 3 or the number of equivalent cycles. More specifically, the (aging) residual capacity of a sodium-sulfur battery that prevents a charge increases with operating time, so that the ratio to an available capacity changes even when the depth of discharge remains unchanged (refer to FIG. 3).

The following will describe the method for setting the block abnormality determination set point K1 and the depth of discharge abnormality determination set point K2.

Figure 7:
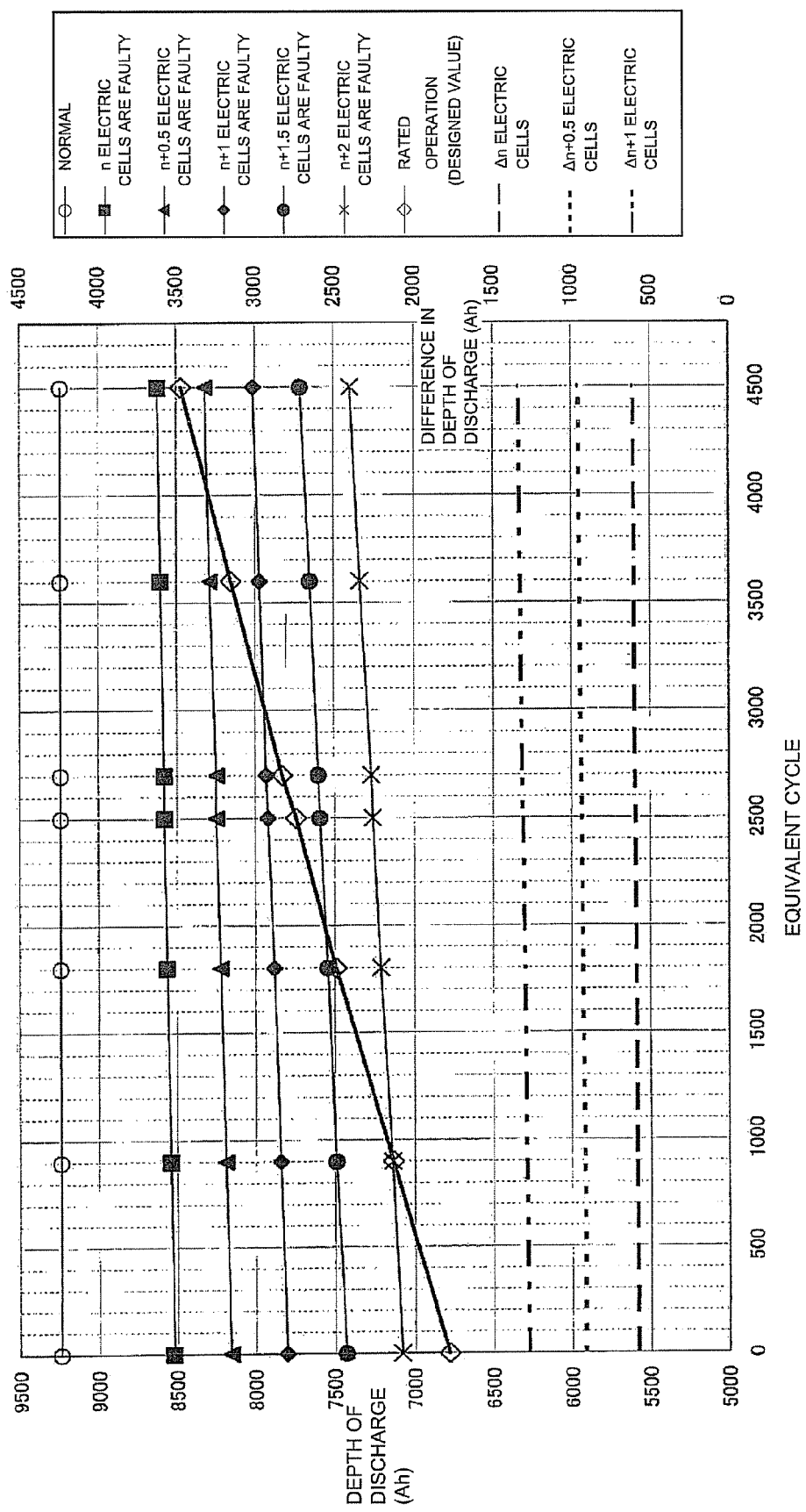
FIG. 7 is a graph illustrating the relationship between equivalent cycle and depth of discharge [Ah] of a sodium-sulfur battery (the left axis of ordinate) and the relationship between equivalent cycle and the difference in depth [Ah] (of normal/abnormal blocks) (the right axis of ordinate).

FIG. 7 is a graph illustrating the relationship between the equivalent cycle of the sodium-sulfur battery and the depth of discharge [Ah] (the left axis of ordinate). FIG. 7 indicates the block depth of discharges at discharge limits when the equivalent cycle is 0 (0 cycle), 900, 1800, 2500, 2700, 3600, and 4500 in the case where (the sodium-sulfur battery) is normal, the case where an n number of pieces is faulty, the case where an n+0.5 number of pieces is faulty, the case where an n+1 number of pieces is faulty, the case where an n+1.5 number of pieces is faulty, and the case where an n+2 number of pieces is faulty, respectively.

Further, FIG. 7 illustrates the relationship between the equivalent cycle and the difference in depth between normal and abnormal blocks (the difference in the depth of discharge) [Ah] (the right axis of ordinate) in each of the case where the n number of pieces is faulty, the case where the n+0.5 number of pieces is faulty, and the case where the n+1 number of pieces is faulty.

Figure 8:
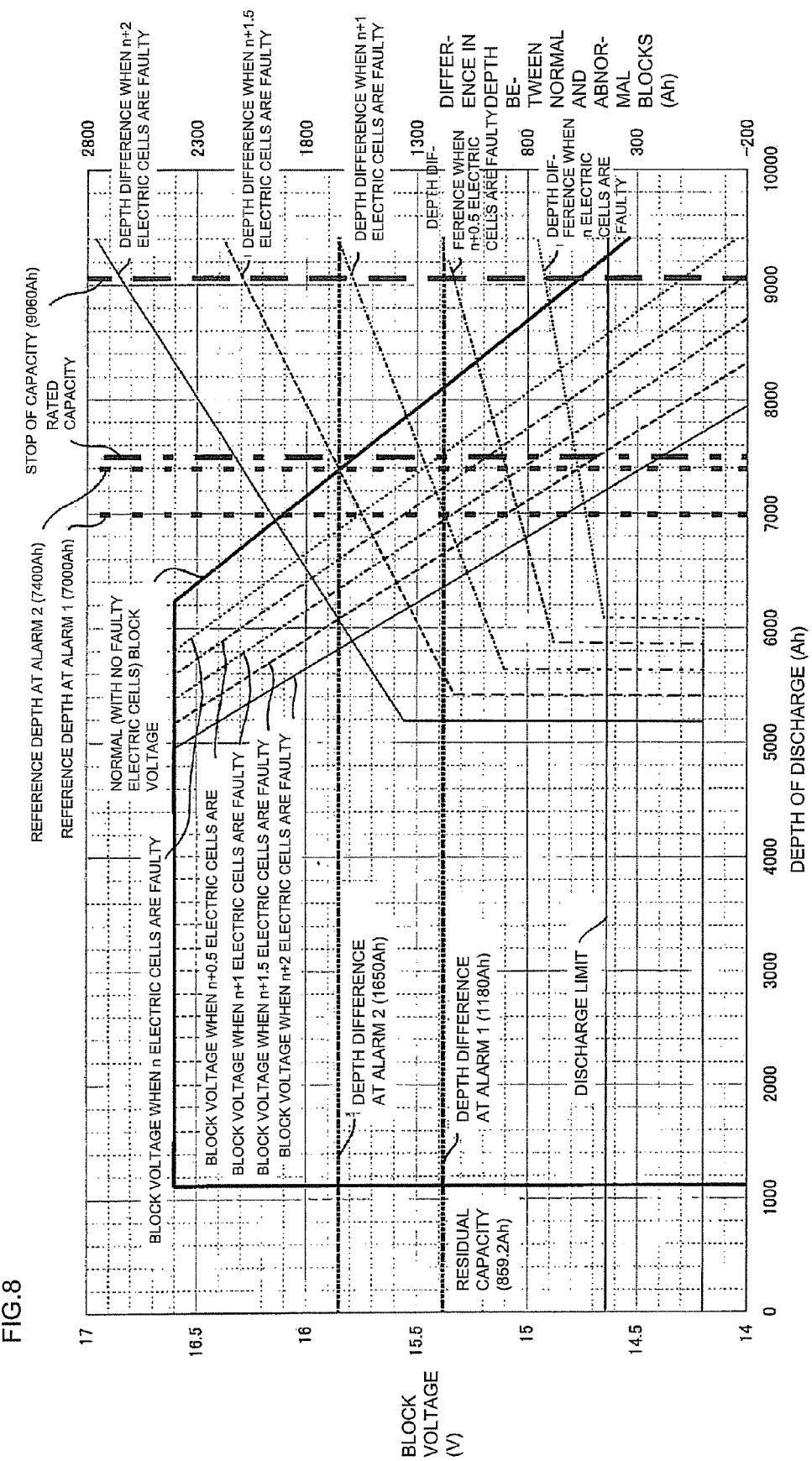
FIG. 8 is a graph illustrating the relationship between depth of discharge [Ah] and block voltage [V] (the left axis of ordinate) and the relationship between depth of discharge [Ah] and the difference in depth [Ah] between a normal block and an abnormal block [Ah] (the right axis of ordinate) in the sodium-sulfur battery when the equivalent cycle reaches 1800.

FIG. 8 is a graph illustrating the relationship between the block voltage [V] (the left axis of ordinate) and the depth of discharge [Ah] in the sodium-sulfur battery having its equivalent cycles reaching 1800. The difference in depth between the normal and the abnormal blocks is the difference in the depth of discharge between a normal block and an abnormal block. FIG. 8 illustrates how the block voltages drop as the depth of discharge increases (as the discharge progresses) in each of the case where the sodium-sulfur battery is normal, the case where the n number of pieces is faulty, the case where the n+0.5 number of pieces is faulty, the case where the n+1 number of pieces is faulty, the case where the n+1.5 number of pieces is faulty, and the case where the n+2 number of pieces is faulty.

FIG. 8 also illustrates the relationship between the difference in depth between normal and abnormal blocks [Ah] (the right axis of ordinate) and the depth of discharge [Ah] in each of the case where the n number of pieces is faulty, the case where the n+0.5 number of pieces is faulty, the case where the n+1 number of pieces is faulty, the case where the n+1.5 number of pieces is faulty, and the case where the n+2 number of pieces is faulty.

In FIG. 7 and FIG. 8, (the case of) being normal means the case of a normal block (the case where no electric cells are faulty (no failure)). The number of faulty pieces means the number of faulty electric cells. When an electric cell is faulty, it means that the block including the faulty electric cell is a faulty block. The equivalent cycle indicates the number corresponding to the number of cycles of discharges at the rated capacity (Ah). The fault of the n+0.5 number of pieces is obtained by plotting the intermediate value between the case where the n number of pieces is faulty and the case where the n+1 number of pieces is faulty, and the fault of the n+1.5 number of pieces is obtained by plotting the intermediate value between the case where the n+1 number of pieces is faulty and the case where the n+2 number of pieces is faulty. The depth of discharge is the depth determined from the (stable) block voltage at the end of a discharge, while the depth of discharge that varies with the equivalent cycle is a calculated value based on a numeral value obtained by a test run.

As illustrated in FIG. 8, as the depth of discharge increases (as the discharge proceeds), a drop in the block voltage begins sooner in the abnormal block than in the normal block. Further, as illustrated in FIG. 8, as the depth of discharge increases, the difference in depth between the normal and the abnormal blocks increases due to the influences of faulty electric cells, and the difference in depth between the normal and abnormal blocks also increases as the number of faulty electric cells increases.

If such a sodium-sulfur battery is designed to have a depth of discharge of 6780 [Ah] after a rated-capacity discharge at the beginning (when the battery is brand-new and the equivalent cycle thereof is 0) and to have a depth of discharge of 8470 [Ah] after a rated-capacity discharge in its final year (reaching its expected life, with 4500 equivalent cycles), then it is very likely that the battery will not be capable of outputting the rated capacity when the n+1.5 number of pieces fails after, for example, 1800 cycles, as understood from FIG. 7. In such a case, it is preferable to set the value of the first level of the block abnormality determination set point K1 and the depth of discharge abnormality determination set point K2 to a value for detecting the failure of the n+1 number of pieces and to set the value of the second level to a value for detecting the failure of the n+1.5 number of pieces.

To be more specific, the depth of discharge of the rated-capacity discharge after the elapse of 1800 cycles is 7490 Ah, so that setting a reference depth at 7000 Ah, which is close thereto, makes it possible to set 1180 Ah, which is the difference between the normal and the abnormal block depths in the case where the n+1 number of pieces is faulty at the reference depth, as the first level of the block abnormality determination set point K1 (refer to FIG. 8). Further, considering the depth of discharge at this time as the depth of discharge when the n+1 number of pieces is faulty, 8180 Ah (=7000+1180), which is obtained by adding the reference depth thereto, may be set as the first level of the depth of discharge abnormality determination set point K2.

Further, setting 7400 Ah, which is extremely close to the rated capacity, as the reference depth makes it possible to set 1650 Ah, which is the difference in depth between the normal and the abnormal blocks in the case where the n+1.5 number of pieces is faulty at the reference depth, as the second level of the block abnormality determination set point K1 (refer to FIG. 8). Then, considering the depth of discharge at this time as the depth of discharge when the n+1.5 number of pieces is faulty, 9050 Ah (=7400+1650), which is obtained by adding the reference depth thereto, may be set as the second level of the depth of discharge abnormality determination set point K2.

INDUSTRIAL APPLICABILITY

The method for determining a drop in the capacity of a sodium-sulfur battery in accordance with the present invention may be ideally used as a means for determining an abnormality or a failure of a sodium-sulfur battery used for applications, such as load leveling, measures against a momentary drop in power, or compensation for fluctuations in the power generated by a renewable energy generating device or as a means for identifying a state of the sodium-sulfur battery which is about to incur an abnormality or a failure.

DESCRIPTION OF REFERENCE NUMERALS

3: sodium-sulfur battery; 31: electric cell; 32: string; 33: block; and 34: module

The invention claimed is:

1. A method for determining a drop in capacity of a sodium-sulfur battery whereby to determine that the capacity of the sodium-sulfur battery has dropped to an abnormal level when both expression (1) and expression (2) hold, the sodium-sulfur battery being constituted by connecting an s number of electric cells in series to form a string, connecting a u number of the strings in parallel to form a block, connecting a b number of the blocks in series to form a module, and then connecting an m number of the modules in series;

$$Qe - Qn \geq 1 \quad (1)$$

where
Qe indicates a lowest voltage block depth of discharge
Qn indicates a selected block depth of discharge
K1 is a setting value indicating a block abnormality determination set point;

$$Qe \geq K2 \quad (2)$$

where
K2 is a setting value indicating a depth of discharge abnormality determination set point;

$$Qn = u \times f1(Vi(t,T,\text{Id}))$$

where
f1 (Vi (t, T, Id)) is a transform function for determining depth of discharge of a block by,
for each module in the sodium-sulfur battery,
    measuring, by a voltage measuring device, the unstable open-circuit voltage of each block of the module t hours after completion of a discharge, in the single-phase region, of the module,
    converting, by a conversion unit, the unstable open-circuit voltage to a stable open-circuit voltage,
    correcting the stable open-circuit voltage on the basis of a temperature T and a current Id upon completion of the discharge, and
    determining a highest voltage block of the module as the block having the highest corrected stable open-circuit voltage module;
comparing the corrected stable open-circuit voltages of the highest voltage blocks between the modules;
determining Vi as an i-th highest voltage among the highest voltage blocks of the modules; and then
determining the depth of discharge of the i-th highest voltage block on the basis of the voltage Vi; and $$Qe = u \times f2(V\min(t,T,\text{Id}))$$

where
f2 (Vmin (t, T, Id)) is a transform function for determining the depth of discharge of a block by,
for each module in the sodium-sulfur battery,
    measuring, by a voltage measuring device, the unstable open-circuit voltage of each block of the module t hours after completion of a discharge, in the single phase region, of the module,
    converting, by a conversion unit, the unstable open-circuit voltage to a stable open-circuit voltage,
    correcting the stable open-circuit voltage on the basis of a temperature T and a current Id upon completion of the discharge, and
    determining a low voltage block of the module as the block having the lowest corrected stable open-circuit voltage of the module;
comparing the corrected stable open-circuit voltages of the low voltage blocks between the modules;
determining Vmin as the lowest voltage among the low voltage blocks of the modules; and then
determining the depth of discharge of the lowest voltage block on the basis of the voltage Vmin.

2. The method for determining a drop in the capacity of a sodium-sulfur battery according to claim 1, wherein the sodium-sulfur battery to be determined is a sodium-sulfur battery which constitutes an electric power storage-compensation device to compensate for output fluctuations in a power generating device in an interconnected system, which combines the power generating device incurring output fluctuations and the electric power storage-compensation device to supply power to a power system.

3. The method for determining a drop in the capacity of a sodium-sulfur battery according to claim 1, wherein each of the block abnormality determination set point K1 and the depth of discharge abnormality determination set point K2 is set in a plurality of levels.

4. The method for determining a drop in the capacity of a sodium-sulfur battery according to claim 3, wherein the sodium-sulfur battery to be determined is a sodium-sulfur battery which constitutes an electric power storage-compensation device to compensate for output fluctuations in a power generating device in an interconnected system, which combines the power generating device incurring output fluctuations and the electric power storage-compensation device to supply power to a power system.

* * * * *